United States Patent
Wang et al.

(10) Patent No.: US 12,232,131 B2
(45) Date of Patent: Feb. 18, 2025

(54) METHOD, APPARATUS, AND DEVICE OF PROCESSING TERMINAL CAPABILITY

(71) Applicant: DATANG MOBILE COMMUNICATIONS EQUIPMENT CO., LTD., Beijing (CN)

(72) Inventors: Lei Wang, Beijing (CN); Xuejuan Gao, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 414 days.

(21) Appl. No.: 17/632,138

(22) PCT Filed: May 28, 2020

(86) PCT No.: PCT/CN2020/092808
§ 371 (c)(1),
(2) Date: Feb. 1, 2022

(87) PCT Pub. No.: WO2021/022874
PCT Pub. Date: Feb. 11, 2021

(65) Prior Publication Data
US 2022/0279490 A1    Sep. 1, 2022

(30) Foreign Application Priority Data
Aug. 2, 2019    (CN) .......................... 201910711791.1

(51) Int. Cl.
*H04W 72/23* (2023.01)
*H04L 1/00* (2006.01)
*H04W 72/0446* (2023.01)

(52) U.S. Cl.
CPC ........... *H04W 72/23* (2023.01); *H04L 1/0038* (2013.01); *H04W 72/0446* (2013.01)

(58) Field of Classification Search
CPC .. H04L 1/0038; H04W 72/0446; H04W 72/23
(Continued)

(56) References Cited

U.S. PATENT DOCUMENTS 10,616,910 B2 *  4/2020  Xu .......................... H04L 5/0044
2016/0157218 A1 * 6/2016  Nam .................... H04B 7/0632
                                              370/329
(Continued)

FOREIGN PATENT DOCUMENTS

CN            109257823 A        1/2019

OTHER PUBLICATIONS

Extended European Search Report for European Patent Application 20850212.0 issued on Jul. 29, 2022.
(Continued)

*Primary Examiner* — Dang T Ton
(74) *Attorney, Agent, or Firm* — Ladas & Parry, LLP

(57) ABSTRACT

A method, an apparatus and a device of processing a terminal capability are provided and related to the field of communications. The method performed by a network-side device includes: receiving at least one set of downlink control channel monitoring capability information; wherein, each set of downlink control channel monitoring capability information includes: a minimum quantity of symbols in an interval between adjacent spans, a maximum quantity of consecutive symbols within a span, and at least one of following information: a quantity of blind detections and a quantity of non-overlapping Control Channel Elements CCEs supported by a terminal within a span.

14 Claims, 4 Drawing Sheets

(58) Field of Classification Search
USPC .................... 370/329, 400, 401, 405, 395
See application file for complete search history.

(56) References Cited

U.S. PATENT DOCUMENTS

2019/0141695 A1    5/2019   Alireza et al.
2021/0314864 A1   10/2021   Xue et al.

OTHER PUBLICATIONS

"Maintenance for physical downlink control channel," 3GPP TSG RAN WG1 Meeting #94, R1-1809426, Gothensburg, Sweden, Aug. 20-Aug. 24, 2018, Source: Qualcomm Incorporated, Agenda Item: 7.1.3.1, all pages.

"PDCCH enhancements for URLLC," 3GPP TSG RAN WG1 Meeting#97, R1-1906057, Reno, USA, May 13-17, 2019, Agenda Item: 7.2.6.1, Source: Huawei, HiSilicon, all pages.

"On PDCCH Enhancements for NR URLLC," 3GPP TSG RAN WG1#97, R1-1906751, Reno, Nevada, US, May 13-17, 2019, Agenda Item: 7.2.6.1, Source: Nokia, Nokia Shanghai Bell, all pages.

"Discussion on PDCCH monitoring capability," 3GPP TSG RAN WG1 Meeting #97, R1-1907546, Reno, USA, May 13-17, 2019, Agenda Item: 7.2.6.7, Source: Huawei, HiSilicon, all pages.

International Search Report for PCT Application PCT/CN2020/092808 issued on Jul. 29, 2020, and its English Translation provided by WIPO.

Written Opinion for PCT Application PCT/CN2020/092808 issued on Jul. 29, 2020, and its English Translation provided by WIPO.

International Preliminary Report on Patentability for PCT Application PCT/CN2020/092808 issued on Feb. 8, 2022 and its English Translation provided by WIPO.

"PDCCH enhancements for URLLC," 3GPP TSG RAN WG1 Meeting #97, R1-1906327, Reno, USA, May 13-17, 2019, Source: CATT, Agenda Item: 7.2.6.1, all pages.

"Summary of Thursday offline discussion on PDCCH enhancements," 3GPP TSG RAN WG1 Meeting #97, R1-1907835, Reno, USA, May 13-17, 2019 Agenda Item: 7.2.6.1, Source: Huawei, all pages.

"PDCCH enhancements for URLLC," 3GPP TSG RAN WG1 Meeting #98 R1-1908594, Prague, CZ, Aug. 26-30, 2019, source: CATT, Agenda Item: 7.2.6.1, Document for: Discussion and Decision; all pages.

* cited by examiner

Receiving at least one set of downlink control channel monitoring capability information; wherein, each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements CCEs supported by a terminal within a span ⸺ 101

Fig.1

Determining, based on the configuration information, the quantities of symbols in intervals between a current span and adjacent spans ⸺ 201

Determining, based on the quantities of symbols in intervals between the current span and the adjacent spans, the maximum quantity of blind detections and/or the maximum quantity of non-overlapping CCEs within the current span ⸺ 202

Configuring the current span based on the maximum quantity of blind detections and/or the maximum quantity of non-overlapping CCEs ⸺ 203

Fig.2

Transmitting at least one set of downlink control channel monitoring capability information; wherein, each set of downlink control channel monitoring capability information includes: a minimum quantity of symbols in an interval between adjacent spans, a maximum quantity of consecutive symbols within a span, and at least one of following information: a quantity of blind detections and the quantity of non-overlapping Control Channel Elements CCEs supported by a terminal within a span — 501

Fig.5

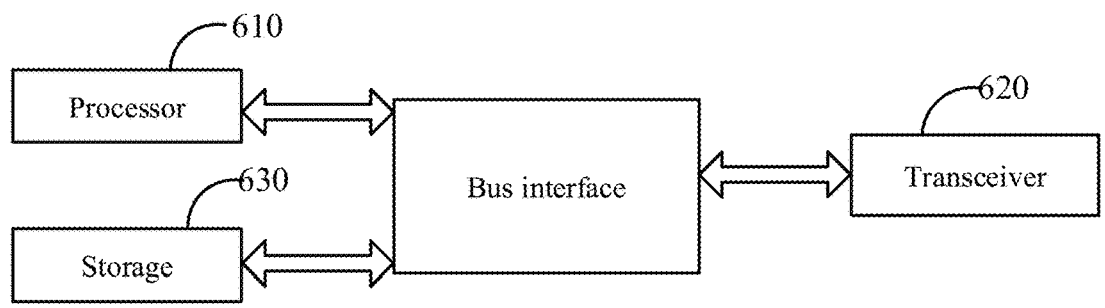

Fig.6

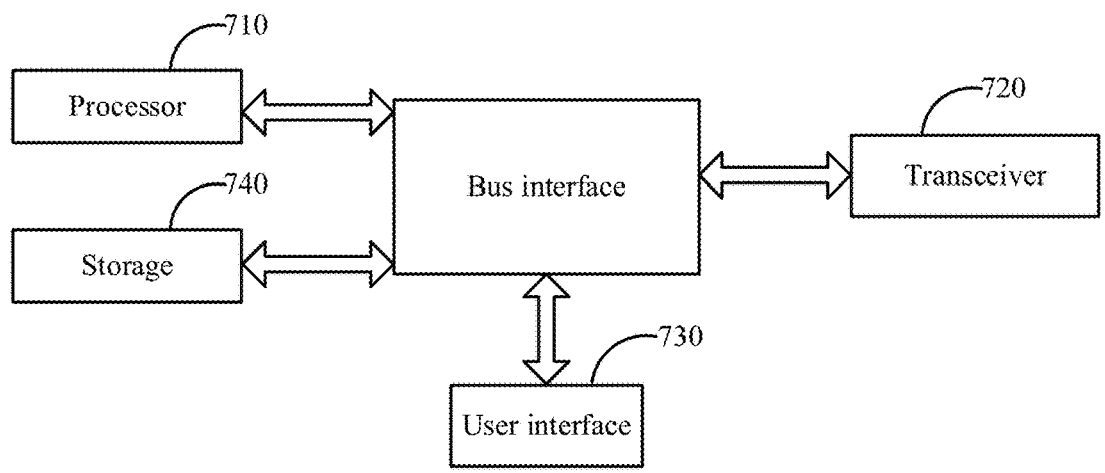

Fig.7

METHOD, APPARATUS, AND DEVICE OF PROCESSING TERMINAL CAPABILITY

CROSS-REFERENCE TO RELATED APPLICATIONS

This application is a U.S. national phase application of a PCT Application No. PCT/CN2020/092808 filed on May 28, 2020, which claims a priority to the Chinese patent application No. 201910711791.1 filed in China on Aug. 2, 2019, the disclosures of which are incorporated herein by reference in their entireties.

TECHNICAL FIELD

The present disclosure relates to the field of communications, and in particular, relates to a method of processing a terminal capability, an apparatus of processing a terminal capability and a device of processing a terminal capability.

BACKGROUND

In the current $5^{th}$ Generation mobile communication technology (5G) New Radio (NR), a terminal needs to report a capability related to blind detection of a Physical Downlink Control Channel (PDCCH). The capability represents a span structure supported by the terminal, including a time-domain length of a span, and a time interval between two adjacent spans.

The terminal reports a set of capabilities including multiple span codeword combinations and is denoted by (X, Y), wherein X denotes the quantity of symbols in an interval between two adjacent spans and Y denotes the quantity of consecutive symbols included in one span. After the terminal reports the capability, locations of search spaces and an interval between the search spaces configured by a network-side device need to satisfy limits of the (X, Y). The reported capability does not restrict the quantity of Blind Detections (BDs) within a span or the quantity of non-overlapping Control Channel Elements (CCEs).

The quantity of blind detections or the quantities of non-overlapping CCEs is defined only per slot. This means that the network-side device can configure a larger quantity of BDs or non-overlapping CCEs within one span, while configure a very small quantity of BDs and CCEs within other spans. This is a huge challenge for the terminal. For example, Ultra Reliable Low Latency Communications (URLLC) services require low latency and highly reliable downlink control transmission, resulting in that the quantity of non-overlapping CCEs that need to be processed within a slot can be much larger than the capability of the terminal.

SUMMARY

An objective of embodiments of the present disclosure is to provide a method, an apparatus and a device of processing a terminal capability, to avoid the terminal from failing to achieve maximum capability usage.

To achieve the above objective, an embodiment of the present disclosure provides a method of processing a terminal capability performed by a network-side device, and the method includes:
receiving at least one set of downlink control channel monitoring capability information; wherein each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

Optionally, subsequent to receiving the at least one set of downlink control channel monitoring capability information, the method further includes:
generating, according to the at least one set of downlink control channel monitoring capability information, configuration information of a time-domain location of a downlink control channel search space, wherein the configuration information is used for determining a location of the span in a time domain;
transmitting the configuration information.

Optionally, subsequent to generating the configuration information of the time-domain location of the downlink control channel search space, the method further includes:
determining, based on the configuration information, the quantities of symbols in intervals between a current span and adjacent spans;
determining, based on the quantities of symbols in the intervals between the current span and the adjacent spans, the maximum quantity of blind detections and/or the maximum quantity of non-overlapping CCEs within the current span;
configuring the current span based on the maximum quantity of blind detections and/or the maximum quantity of non-overlapping CCEs.

Optionally, determining, based on the quantities of symbols in the intervals between the current span and the adjacent spans, the maximum quantity of blind detections and/or the maximum quantity of non-overlapping CCEs within the current span includes:
in a case that there is a span, of the adjacent spans of the current span, with the quantity of consecutive symbols less than or equal to a target threshold, selecting the minimum of the quantities of symbols in the intervals between the current span and the adjacent spans as the target interval symbol quantity; wherein the target threshold is equal to a maximum value of the all maximum quantities of consecutive symbols in the at least one set of downlink control channel monitoring capability information reported by the terminal;
determining a maximum value, of all minimum interval symbol quantities in the at least one set of downlink control channel monitoring capability information reported by the terminal and less than or equal to the target interval symbol quantity, as the target minimum interval symbol quantity;
determining the maximum quantity of blind detections and/or the maximum quantity of non-overlapping CCEs based on downlink control channel monitoring capability information to which the target minimum interval symbol quantity belongs.

To achieve the above objective, an embodiment of the present disclosure further provides a method of processing a terminal capability performed by a terminal, and the method includes:
transmitting at least one set of downlink control channel monitoring capability information; wherein each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

Optionally, subsequent to transmitting the at least one set of downlink control channel monitoring capability information, the method further includes:

receiving configuration information of a time-domain location of a downlink control channel search space transmitted by a network-side device, wherein the configuration information is used for determining a location of the span in a time domain;

determining, based on the configuration information, the quantities of symbols in intervals between a current span and adjacent spans;

determining, based on the quantities of symbols in the intervals between the current span and the adjacent spans, the maximum quantity of blind detections and/or the maximum quantity of non-overlapping CCEs within the span;

dropping a downlink control channel based on the maximum quantity of blind detections and/or the maximum quantity of non-overlapping CCEs in a case that the quantity of blind detections or the quantity of non-overlapping CCEs configured actually within a span exceeds a maximum blind detection capability of the terminal.

Optionally, determining, based on the quantities of symbols in the intervals between the current span and the adjacent spans, the maximum quantity of blind detections and/or the maximum quantity of non-overlapping CCEs within the current span includes:

in a case that there is a span, of the adjacent spans of the current span, with the quantity of consecutive symbols less than or equal to a target threshold, selecting the minimum of the quantities of symbols in the intervals between the current span and the adjacent spans as the target interval symbol quantity; wherein the target threshold is equal to a maximum value of the all maximum quantities of consecutive symbols in the at least one set of downlink control channel monitoring capability information reported by the terminal;

determining a maximum value, of all minimum interval symbol quantities in the at least one set of downlink control channel monitoring capability information reported by the terminal and less than or equal to the target interval symbol quantity, as the target minimum interval symbol quantity;

determining the maximum quantity of blind detections and/or the maximum quantity of non-overlapping CCEs based on downlink control channel monitoring capability information to which the target minimum interval symbol quantity belongs.

To achieve the above objective, an embodiment of the present disclosure further provides a network-side device, including a transceiver, a storage, a processor and a computer program stored on the storage and executable by the processor; wherein, the transceiver is configured to:

receive at least one set of downlink control channel monitoring capability information; wherein each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

Optionally, the processor is configured to: generate, according to the at least one set of downlink control channel monitoring capability information, configuration information of a time-domain location of a downlink control channel search space, wherein the configuration information is used for determining a location of the span in a time domain;

the transceiver is further configured to transmit the configuration information.

Optionally, the processor is further configured to:

determine, based on the configuration information, the quantities of symbols in intervals between a current span and adjacent spans;

determine, based on the quantities of symbols in the intervals between the current span and the adjacent spans, the maximum quantity of blind detections and/or the maximum quantity of non-overlapping CCEs within the current span;

configure the current span based on the maximum quantity of blind detections and/or the maximum quantity of non-overlapping CCEs.

Optionally, the processor is further configured to:

in a case that there is a span, of the adjacent spans of the current span, with the quantity of consecutive symbols less than or equal to a target threshold, select the minimum of the quantities of symbols in the intervals between the current span and the adjacent spans as the target interval symbol quantity; wherein the target threshold is equal to a maximum value of the all maximum quantities of consecutive symbols in the at least one set of downlink control channel monitoring capability information reported by the terminal;

determine a maximum value, of all minimum interval symbol quantities in the at least one set of downlink control channel monitoring capability information reported by the terminal and less than or equal to the target interval symbol quantity, as the target minimum interval symbol quantity;

determine the maximum quantity of blind detections and/or the maximum quantity of non-overlapping CCEs based on downlink control channel monitoring capability information to which the target minimum interval symbol quantity belongs.

To achieve the above objective, an embodiment of the present disclosure further provides a terminal, including a transceiver, a storage, a processor and a computer program stored on the storage and executable by the processor; wherein, the transceiver is configured to:

transmit at least one set of downlink control channel monitoring capability information; wherein each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

Optionally, the transceiver is further configured to: receive configuration information of a time-domain location of a downlink control channel search space transmitted by a network-side device, wherein the configuration information is used for determining a location of the span in a time domain;

the processor is configured to: determine, based on the configuration information, the quantities of symbols in intervals between a current span and adjacent spans;

determine, based on the quantities of symbols in the intervals between the current span and the adjacent spans, the maximum quantity of blind detections and/or the maximum quantity of non-overlapping CCEs within the current span;

drop a downlink control channel based on the maximum quantity of blind detections and/or the maximum quantity of non-overlapping CCEs in a case that the quantity of blind detections or the quantity of non-overlapping CCEs configured actually within a span exceeds a maximum blind detection capability of the terminal.

Optionally, the processor is further configured to:

in a case that there is a span, of the adjacent spans of the current span, with the quantity of consecutive symbols less than or equal to a target threshold, select the minimum of the quantities of symbols in the intervals between the current span and the adjacent spans as the target interval symbol quantity; wherein the target threshold is equal to a maximum value of the all maximum quantities of consecutive symbols in the at least one set of downlink control channel monitoring capability information reported by the terminal;

determine a maximum value, of all minimum interval symbol quantities in the at least one set of downlink control channel monitoring capability information reported by the terminal and less than or equal to the target interval symbol quantity, as the target minimum interval symbol quantity;

determine the maximum quantity of blind detections and/or the maximum quantity of non-overlapping CCEs based on downlink control channel monitoring capability information to which the target minimum interval symbol quantity belongs.

To achieve the above objective, an embodiment of the present disclosure further provides an apparatus for processing a terminal capability applied to a network-side device, and the apparatus includes:

a reception module, configured to receive at least one set of downlink control channel monitoring capability information; wherein each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

To achieve the above objective, an embodiment of the present disclosure further provides an apparatus for processing a terminal capability applied to a terminal, and the apparatus includes:

a transmission module, configured to transmit at least one set of downlink control channel monitoring capability information; wherein each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

To achieve the above objective, an embodiment of the present disclosure further provides a computer readable storage medium storing thereon a computer program, and when the program is executed by a processor, the processor implements the steps of the method of processing the terminal capability performed by the network-side device, or the steps of the method of processing the terminal capability performed by the terminal.

Beneficial effects of the above technical solutions of the present disclosure following as follows.

In the embodiment of the present disclosure, at least one set of downlink control channel monitoring capability information reported by the terminal may be received, where each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping CCEs supported by a terminal within a span. In this way, the network-side device is able to use at least one set of downlink control channel monitoring capability information reported by the terminal, to maximize the terminal capability in subsequent configurations so as to avoid the terminal from failing to achieve maximum capability usage.

BRIEF DESCRIPTION OF THE DRAWINGS

FIG. 1 is a first schematic flowchart illustrating a method of processing a terminal capability, applied to a network-side device according to an embodiment of the present disclosure;

FIG. 2 is a second schematic flowchart illustrating a method of processing a terminal capability, applied to a network-side device according to an embodiment of the present disclosure;

FIG. 5 is a schematic flowchart illustrating a method of processing a terminal capability, applied to a terminal according to an embodiment of the present disclosure;

FIG. 6 is a schematic structural diagram illustrating a network-side device according to an embodiment of the present disclosure;

FIG. 7 is a schematic structural diagram illustrating a terminal according to an embodiment of the present disclosure;

DETAILED DESCRIPTION

Figure 3:
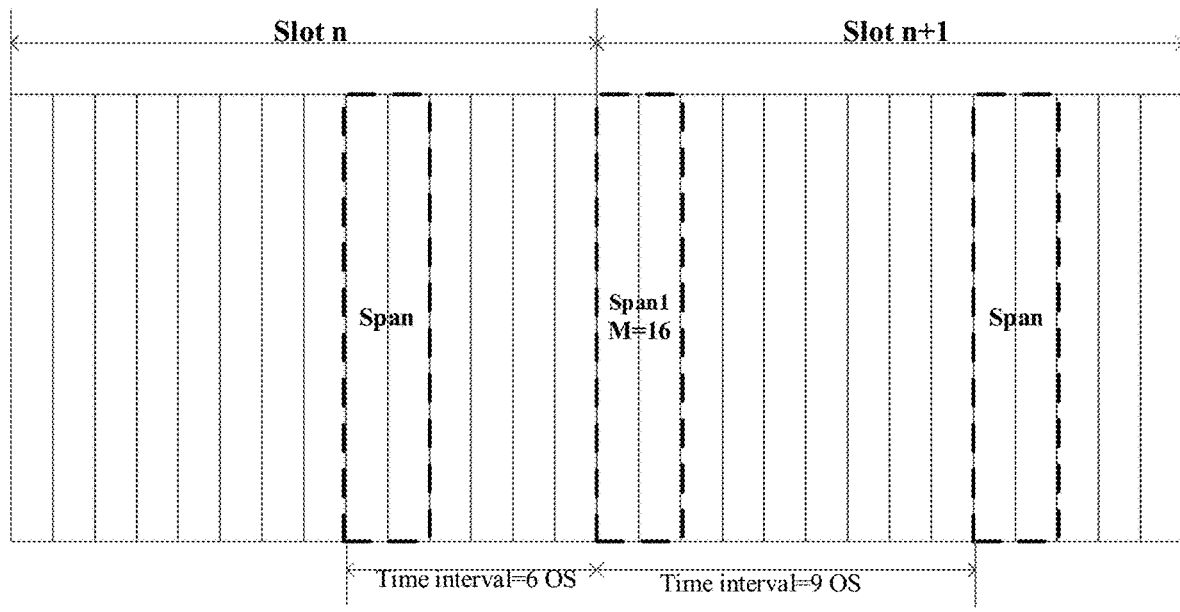
FIG. 3 is a first schematic diagram illustrating a downlink control channel.

In order to make the technical problems to be solved, technical solutions and advantages of the present disclosure more clear, the present disclosure will be described in detail below with reference to the drawings of the specific embodiments.

As shown in FIG. 1, a method of processing a terminal capability according to an embodiment of the present disclosure is performed by a network-side device and includes Step 101.

Step 101: receiving at least one set of downlink control channel monitoring capability information; wherein, each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

According to Step 101, the network-side device can receive at least one set of downlink control channel monitoring capability information reported by the terminal, wherein each set of downlink control channel monitoring capability information includes: the minimum quantity X of symbols in an interval between adjacent spans, the maximum quantity Y of consecutive symbols within a span, and at least one of following information: the quantity of blind detections and the quantity of non-overlapping CCEs supported by a terminal within a span. In this way, the network-side device is able to use at least one set of downlink control channel monitoring capability information reported by the terminal to maximize the terminal capability in subsequent configurations, to avoid the terminal from failing to achieve maximum capability usage.

Optionally, in the embodiment, in order to maximize the terminal capability, after Step 101, the method further includes:

generating, according to the at least one set of downlink control channel monitoring capability information, configuration information of a time-domain location of a downlink control channel search space, wherein the configuration information is used for determining a location of a span in a time domain;

transmitting the configuration information.

Here, the network-side device generates configuration information of a time-domain location of a downlink control channel search space according to the at least one set of downlink control channel monitoring capability information reported by the terminal, wherein the configuration information is used for determining a location of the span in a time domain, and the configuration information is transmitted to the terminal, so that the terminal can achieve the maximum blind detection capability based on the configuration information.

After receiving at least one set of downlink control channel monitoring capability information reported by the terminal, the network-side device determines the location of the span in the time domain according to the actual demand, to meet X and Y supported by the terminal.

In addition, optionally, in the embodiment, subsequent to generating the configuration information of the time-domain location of the downlink control channel search space, as shown in FIG. 2, the method further includes Step 201 to Step 203.

Step 201: determining, based on the configuration information, the quantities of symbols in intervals between a current span and adjacent spans.

Step 202: determining, based on the quantities of symbols in intervals between the current span and the adjacent spans, the maximum quantity of blind detections and/or the maximum quantity of non-overlapping CCEs within the current span.

Step 203: configuring the current span based on the maximum quantity of blind detections and/or the maximum quantity of non-overlapping CCEs.

Here, for the current span to be configured, the network-side device can firstly learn the location of the span from the configuration information, to determine the quantities of symbols in intervals between the current span and the adjacent spans. Thus, based on the determined quantities of symbols in intervals between the current span and the adjacent spans, the maximum quantity of blind detections and/or the maximum quantity of non-overlapping CCEs within the current span can be further determined, and the current span is configured by using the determined maximum quantity of blind detections and/or the maximum quantity of non-overlapping CCEs, enabling the terminal to achieve the maximum blind detection capability in the downlink control channel.

The adjacent spans of the current span are specifically: adjacent spans before and after the current span. Thus, determining the quantities of symbols in intervals between the current span and the adjacent spans includes: the quantity G1 of symbols spaced from the adjacent span before the current span, and the quantity G2 of symbols spaced from the adjacent span after the current span.

Optionally, in the embodiment, Step 202 includes:

in a case that there is a span, of adjacent spans of the current span, with the quantity of consecutive symbols less than or equal to a target threshold, selecting the minimum of the quantities of symbols in the intervals between the current span and the adjacent spans as the target interval symbol quantity; where the target threshold is equal to a maximum value among the all maximum quantities of consecutive symbols in the at least one set of downlink control channel monitoring capability information reported by the terminal;

determining a maximum value, of all minimum interval symbol quantities which are in the at least one set of downlink control channel monitoring capability information reported by the terminal and less than or equal to the target interval symbol quantity, as the target minimum interval symbol quantity;

determining the maximum quantity of blind detections and/or the maximum quantity of non-overlapping CCEs based on downlink control channel monitoring capability information to which the target minimum interval symbol quantity belongs.

Here, a maximum value of the all maximum quantities of consecutive symbols in the at least one set of downlink control channel monitoring capability information reported by the terminal is used as the target threshold. In a case that there is a span, of adjacent spans of the current span, with the quantity of consecutive symbols less than or equal to the target threshold, the minimum of the quantities of symbols in the intervals between the current span and the adjacent spans is selected as the target interval symbol quantity; then, a maximum value, of all minimum interval symbol quantities in the at least one set of downlink control channel monitoring capability information reported by the terminal and less than or equal to the target interval symbol quantity, is determined as the target minimum interval symbol quantity; afterwards, the current span is configured by using the quantity of blind detections and/or the quantity of non-overlapping CCEs in the set of downlink control channel monitoring capability information to which the determined target minimum interval symbol quantity is attributed.

For example, the terminal reports two sets of downlink control channel monitoring capability information (X1, Y1, M1) and (X2, Y2, M2), wherein M1 and M2 are the quantity of blind detections and/or the quantity of non-overlapping CCEs supported by the terminal within the span. Assuming that X1<X2, Y1<Y2, and the quantities of consecutive symbols corresponding to the adjacent spans of the current span are N1 and N2, respectively, and the quantities of symbols in intervals between the current span and the adjacent spans are G1 and G2, and N1≤Y2, G1<G2, then G1 is chosen as the target interval symbol quantity. If X2>G1, G1>X1, then the target minimum interval symbol quantity is determined as X1, that is, the current span can be configured by using M1 in the downlink control channel monitoring capability information (X1, Y1, M1) to which X1 belongs. If X2<G1, X1<G1, then the target minimum interval symbol quantity is determined as X2, that is, the current span can be configured by using M2 in the downlink control channel monitoring capability information (X2, Y2, M2) to which X2 belongs.

In this way, the network-side device transmits the downlink control channel, and the terminal may determine, based on the configuration information and from the received configuration information (the configuration information of the time-domain location of the downlink control channel search space), the quantities of symbols in intervals between the current span and adjacent spans, and then determine, from the quantities of symbols in intervals between the current span and adjacent spans, the maximum quantity of blind detections and/or the maximum quantity of non-overlapping CCEs within the span; eventually, downlink control channel dropping (PDCCH dropping) is performed based on the maximum quantity of blind detections and/or the maximum quantity of non-overlapping CCEs in a case that the quantity of blind detections or the quantity of non-overlapping CCEs configured actually within the span exceeds a maximum blind detection capability of the terminal.

Similarly, as specifically implemented by the network-side device, the maximum quantity of blind detections and/or the maximum quantity of non-overlapping CCEs within the span is determined based on the quantities of symbols in intervals between that current span and adjacent spans: a maximum value of the all maximum quantities of consecutive symbols in the at least one set of downlink control channel monitoring capability information reported by itself is used as the target threshold. In a case that there is a span, of adjacent spans of the current span, with the quantity of consecutive symbols less than or equal to a target threshold, the minimum of the quantities of symbols in the intervals between the current span and the adjacent spans is selected as the target interval symbol quantity; then, a maximum value, of all minimum interval symbol quantities, in the at least one set of downlink control channel monitoring capability information reported by the terminal and less than or equal to the target interval symbol quantity, is determined as the target minimum interval symbol quantity; afterwards, the quantity of blind detections and the quantity of non-overlapping CCEs in the set of downlink control channel monitoring capability information attributed by the determined target minimum interval symbol quantity are used as the maximum quantity of blind detections and the maximum quantity of non-overlapping CCEs, respectively, to complete PDCCH dropping.

Application of the methods of embodiments of the present disclosure is illustrated below in relation to specific scenarios.

Scenario 1: assuming that the terminal reports multiple sets of downlink control channel monitoring capability information at the same time, such as (X1, Y1, M1) and (X2, Y2, M2). Assuming that (X1, Y1, M1)=(2, 2, 16), (X2, Y2, M2)=(7, 3, 48). Wherein, X denotes the minimum quantity of symbols in an interval between two adjacent spans, Y denotes the maximum quantity of consecutive symbols within a span in time domain, and M denotes the quantity of BDs or non-overlapping CCEs supported by the terminal within a span.

When the network-side device configures a downlink control channel search space for the terminal, and when a span satisfies both time-domain constraints (2, 2) and (7, 3), the downlink control channel monitoring capability information (X, Y, M) that should be followed is determined according to the following procedure.

Step1: reporting, by the terminal, downlink control channel monitoring capability information (2, 2, 16), (7, 3, 48) of the terminal.

Step2: receiving, by the network-side device, the downlink control channel monitoring capability information reported by the terminal.

Step3: determining, by the network-side device, a location of a span in a time domain according to an actual demand, generating configuration information of the time-domain location of the downlink control channel search space, and informing the configuration information to the terminal, and calculating the quantities of symbols in intervals between the span and two adjacent spans of this span.

Step4: if the quantities of symbols in intervals between the span and its adjacent spans are less than 7, then determining the quantity of BDs or non-overlapping CCEs within the span to be 16, i.e., the quantity of BDs or non-overlapping CCEs configured within the span should be guaranteed to be less than or equal to 16; otherwise, determining the quantity of BDs or non-overlapping CCEs within the span to be 48, i.e., the quantity of BDs or non-overlapping CCEs configured within the span should be less than or equal to 48.

The terminal side reports downlink control channel monitoring capability information (2, 2, 16), (7, 3, 48) of the terminal, and determines, according to the following way, the maximum blind detection capability restriction that should be followed in a case that the quantity of blind detections or the quantity of non-overlapping CCEs configured actually within a span exceeds the maximum blind detection capability of the terminal (such as, overbooking occurs): the terminal receives the configuration information of the time-domain location of the downlink control channel search space transmitted by the network-side device, determines a location of each span, and calculates the quantities of symbols in intervals between the span and two adjacent spans.

When the quantities of symbols in intervals between the span and its adjacent spans are less than 7, the maximum quantity of BDs or non-overlapping CCEs within the span is determined to be 16, i.e., the terminal performs a PDCCH dropping operation within the span according to the maximum blind detection capability of 16; otherwise, the maximum quantity of BDs or non-overlapping CCEs within the span is determined to be 48, i.e., the terminal performs a PDCCH dropping operation within the span according to the maximum blind detection capability of 48.

Figure 4:
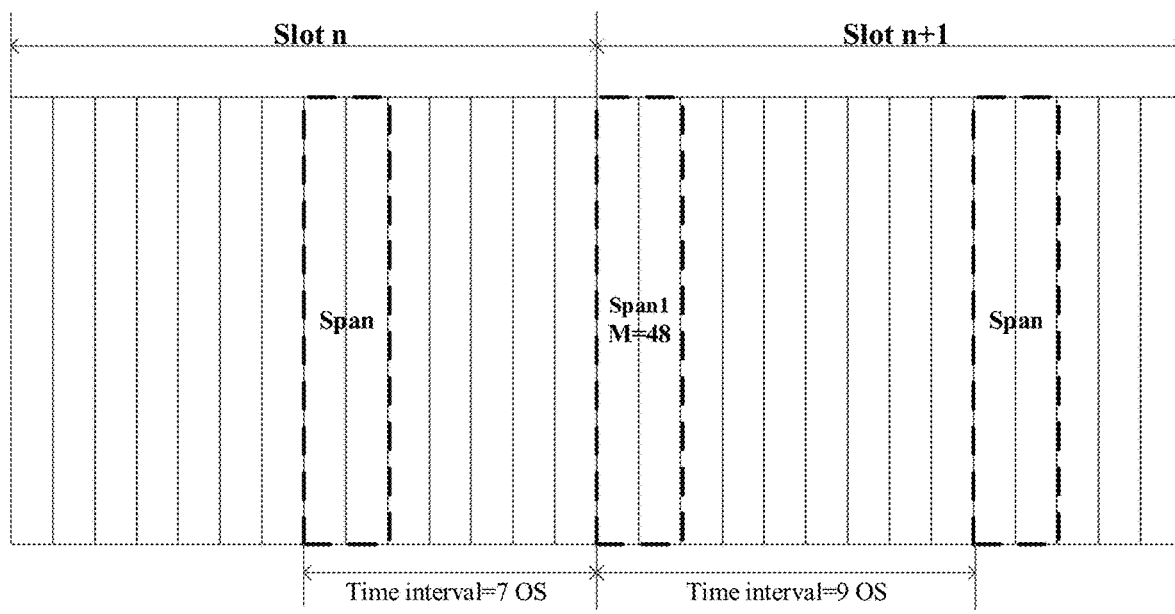
FIG. 4 is a second schematic diagram illustrating a downlink control channel.

As shown in FIG. 3, in case that GAP=6 OS between a span1 and a previous span of the span1 and GAP=9 OS between the span1 and a latter span of the span1, then M within the span should be 16 since 6 OS does not satisfy a separation requirement in (7, 3, 48). As shown in FIG. 4, in a case that GAP=7 OS between the span1 and the previous span of the span1 and GAP=9 OS between the span1 and the latter span of the span1, both 7 OS and 9 OS satisfy the separation requirement in (7, 3, 48), thus M within the span should be 48.

Scenario 2: assuming that the terminal reports multiple sets of downlink control channel monitoring capability information at the same time, such as (X1, Y1, M1), (X2, Y2, M2) and (X3, Y3, M3). In the embodiment, assuming that (X1, Y1, M1)=(2, 2, 16), (X2, Y2, M2)=(4, 3, 32), (X3, Y3, M3)=(7, 3, 48). Where, X denotes the minimum quantity of symbols in an interval between two adjacent spans, Y denotes the maximum quantity of consecutive symbols within a span in the time domain, and M denotes the quantity of non-overlapping CCEs or BDs supported by the terminal within a span.

When the network-side device configures a downlink control channel search space for the terminal, and when a span satisfies all time-domain constraints (2, 2), (4, 3) and (7, 3), the downlink control channel monitoring capability information (X, Y, M) that should be followed is determined according to the following procedure.

Step1: reporting, by the terminal, downlink control channel monitoring capability information (2, 2, 16), (4, 3, 32) and (7, 3, 48) of the terminal.

Step2: receiving, by the network-side device, the downlink control channel monitoring capability information reported by the terminal.

Step3: determining, by the network-side device, the location of the span in the time domain and a time domain duration of the span according to the actual demand and calculating the quantities of symbols in intervals between the span and its two adjacent spans.

Step4: making further determinations according to the following steps 1)-3).

1) when the quantities of symbols in intervals between the span and its adjacent spans are less than 4, determining the quantity of BDs or non-overlapping CCEs within the span to be 16, i.e., the quantity of BDs or non-overlapping CCEs configured within the span should be guaranteed to be less than or equal to 16.

2) when the quantities of symbols in intervals between the span and its adjacent spans are greater than 4 and less than 7, determining the quantity of BDs or non-overlapping CCEs within the span to be 32, i.e., the quantity of BDs or non-overlapping CCEs configured within the span should be guaranteed to be less than or equal to 32.

3) otherwise, the quantity of BDs or non-overlapping CCEs within the span is determined to be 48, i.e., the quantity of BDs or non-overlapping CCEs configured within the span should be guaranteed to be less than or equal to 48.

The terminal side reports downlink control channel monitoring capability information (2, 2, 16), (4, 3, 32) and (7, 3, 48) of the terminal, and determines, according to the following way, the maximum blind detection capability restriction that should be followed in a case that overbooking occurs.

The terminal receives the configuration information of the time-domain location of the downlink control channel search space transmitted by the network-side device, determines a location of each span, and calculates the quantities of symbols in intervals between the span and two adjacent spans.

When the quantities of symbols in intervals between the span and its adjacent spans are less than 4, the quantity of BDs or non-overlapping CCEs within the span is determined to be 16, i.e., the terminal performs a PDCCH dropping operation within the span according to the maximum blind detection capability of 16;

When the quantities of symbols in intervals between the span and its adjacent spans are greater than 4 and less than 7, the quantity of BDs or non-overlapping CCEs within the span is determined to be 32, i.e., the terminal performs the PDCCH dropping operation within the span according to the maximum blind detection capability of 32; otherwise, the quantity of BDs or non-overlapping CCEs within the span is determined to be 48, i.e., the terminal performs a PDCCH dropping operation within the span according to the maximum blind detection capability of 48.

In summary, in the embodiment of the present disclosure, at least one set of downlink control channel monitoring capability information reported by the terminal may be received by using the method in this embodiment, wherein each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping CCEs supported by a terminal within a span. In this way, the network-side device is able to use at least one set of downlink control channel monitoring capability information reported by the terminal to maximize the terminal capability in subsequent configurations, to avoid the terminal from failing to achieve a maximum capability usage.

As shown in FIG. 5, a method of processing a terminal capability according to an embodiment of the present disclosure is performed by a terminal and includes Step 501.

Step 501: transmitting at least one set of downlink control channel monitoring capability information; wherein,
each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

According to Step 501, the terminal can report at least one set of downlink control channel monitoring capability information, wherein each set of downlink control channel monitoring capability information includes: the minimum quantity X of symbols in an interval between adjacent spans, the maximum quantity Y of consecutive symbols within a span, and at least one of following information: the quantity of blind detections and the quantity of non-overlapping CCEs supported by a terminal within a span. In this way, the network-side device may receive at least one set of downlink control channel monitoring capability information reported by the terminal, and use the same to maximize the terminal capability in subsequent configurations to avoid the terminal from failing to achieve maximum capability usage.

Optionally, in the embodiment, in order to maximize the terminal capability, after Step 501, the method further includes:
receiving configuration information of a time-domain location of a downlink control channel search space transmitted by a network-side device, wherein the configuration information is used for determining a location of the span in a time domain;
in a case that the quantity of blind detections or the quantity of non-overlapping CCEs actually configured within a span exceeds a maximum blind detection capability of the terminal, determining, based on the configuration information, the quantities of symbols in intervals between a current span and adjacent spans.
determining, based on the quantities of symbols in the intervals between the current span and the adjacent spans, the maximum quantity of blind detections and/or the maximum quantity of non-overlapping CCEs within the span;

dropping a downlink control channel based on the maximum quantity of blind detections and/or the maximum quantity of non-overlapping CCEs.

Here, the configuration information is configuration information, of a time-domain location of a downlink control channel search space, generated by the network-side device according to the at least one set of downlink control channel monitoring capability information reported by the terminal. In a case that the quantity of blind detections or the quantity of non-overlapping CCEs configured actually within a span exceeds the maximum blind detection capability of the terminal, the terminal determines, based on the received configuration information, the quantities of symbols in intervals between a current span and adjacent spans, determines the maximum quantity of blind detections and/or the maximum quantity of non-overlapping CCEs within the span based on the quantities of symbols in intervals between the current span and adjacent spans, and eventually, performs the PDCCH dropping based on the maximum quantity of blind detections and/or the maximum quantity of non-overlapping CCEs.

The adjacent spans of the current span are specifically: adjacent spans before and after the current span. Thus, determining the quantities of symbols in the intervals between the current span and the adjacent spans includes: the quantity G1 of symbols spaced from an adjacent span before the current span, and the quantity G2 of symbols spaced from an adjacent span after the current span.

Optionally, determining, based on the quantities of symbols in the intervals between the current span and the adjacent spans, the maximum quantity of blind detections and/or the maximum quantity of non-overlapping CCEs within the span includes:

in a case that there is a span, of the adjacent spans of the current span, with the quantity of consecutive symbols less than or equal to a target threshold, selecting the minimum of the quantities of symbols in the intervals between the current span and the adjacent spans as the target interval symbol quantity; wherein the target threshold is equal to a maximum value of the all maximum quantities of consecutive symbols in the at least one set of downlink control channel monitoring capability information reported by the terminal;

determining the target minimum interval symbol quantity less than or equal to the target interval symbol quantity, according to all minimum interval symbol quantities in the at least one set of downlink control channel monitoring capability information;

determining the maximum quantity of blind detections and/or the maximum quantity of non-overlapping CCEs based on downlink control channel monitoring capability information to which the target minimum interval symbol quantity belongs.

In this way, the terminal uses, as the target threshold, the maximum value of the all maximum quantities of consecutive symbols in the at least one set of downlink control channel monitoring capability information reported by the terminal. In a case that there is a span, of adjacent spans of the current span, with the quantity of consecutive symbols less than or equal to a target threshold, the minimum of the quantities of symbols in the intervals between the current span and the adjacent spans is selected as the target interval symbol quantity; then, in the at least one set of downlink control channel monitoring capability information reported by the terminal, the minimum quantity of symbols in intervals less than or equal to the target interval symbol quantity is determined; afterwards, the quantity of blind detections and/or the quantity of non-overlapping CCEs in the set of downlink control channel monitoring capability information attributed by the determined target minimum interval symbol quantity is determined.

For example, the terminal reports two sets of downlink control channel monitoring capability information (X1, Y1, M1) and (X1, Y1, M2), wherein M1 and M2 are the quantity of blind detections and/or the quantity of non-overlapping CCEs supported by the terminal within the span. Assuming that X1<X2, Y1<Y2, and the quantities of consecutive symbols corresponding to the adjacent spans of the current span are N1 and N2, respectively, and the quantities of symbols in intervals between the current span and the adjacent spans are G1 and G2, respectively, and N1≤Y2, G1<G2, then G1 is chosen as the target interval symbol quantity. If X2>G1, G1>X1, then the target minimum interval symbol quantity is determined as X1, that is, M1 in the downlink control channel monitoring capability information (X1, Y1, M1) to which X1 belongs is used.

It should be noted that, this method is used in combination with the above method performed by the network-side device, to achieve the maximum capability of the terminal, and the implementation of the above embodiment of the method performed by the network-side device is applicable to this method and achieves the same technical effect.

As shown in FIG. 6, a network-side device of an embodiment of the present disclosure includes: a transceiver 620, a storage 630, a processor 610 and a computer program stored on the storage 630 and executable by the processor 610; wherein, the transceiver 620 is configured to:

receive at least one set of downlink control channel monitoring capability information; wherein each set of downlink control channel monitoring capability information includes: the minimum quantity of symbols in an interval between adjacent spans, the maximum quantity of consecutive symbols within a span, and at least one of following information: the quantity of blind detections and/or the quantity of non-overlapping Control Channel Elements (CCEs) supported by a terminal within a span.

Optionally, the processor 610 is configured to execute the program to: generate, according to the at least one set of downlink control channel monitoring capability information, configuration information of a time-domain location of a downlink control channel search space, wherein the configuration information is used for determining a location of the span in a time domain;

the transceiver 620 is further configured to transmit the configuration information.

Optionally, the processor 610 is further configured to execute the program to:

determine, based on the configuration information, the quantities of symbols in intervals between a current span and adjacent spans;

determine, based on the quantities of symbols in the intervals between the current span and the adjacent spans, the maximum quantity of blind detections and/or the maximum quantity of non-overlapping CCEs within the current span;

configure the current span based on the maximum quantity of blind detections and/or the maximum quantity of non-overlapping CCEs.

Optionally, the processor 610 is further configured to execute the program to:

in a case that there is a span, of adjacent spans of the current span, with the quantity of consecutive symbols less than or equal to a target threshold, select the minimum of the quantities of symbols in the intervals between the current span and the adjacent spans as the target interval symbol quantity; wherein the target threshold is equal to a maximum value of the all maximum quantities of consecutive symbols in the at least one set of downlink control channel monitoring capability information reported by the terminal;

determine a maximum value, of all minimum interval symbol quantities which are in the at least one set of downlink control channel monitoring capability information reported by the terminal and less than or equal to the target interval symbol quantity, as the target minimum interval symbol quantity;

determine the maximum quantity of blind detections and/or the maximum quantity of non-overlapping CCEs based on downlink control channel monitoring capability information to which the target minimum interval symbol quantity belongs.

The network-side device can receive at least one set of downlink control channel monitoring capability information reported by the terminal, wherein each set of downlink control channel monitoring capability information includes: the minimum quantity of symbols in an interval between adjacent spans, the maximum quantity of consecutive symbols within a span, and at least one of following information: the quantity of blind detections and/or the quantity of non-overlapping CCEs supported by a terminal within a span. In this way, the network-side device is able to use at least one set of downlink control channel monitoring capability information reported by the terminal, to maximize the terminal capability in subsequent configurations to avoid the terminal from failing to achieve maximum capability usage.

It should be noted that, the method of processing the terminal capability is performed by the network-side device, and the implementation of the above-mentioned embodiment of the method of processing the terminal capability is applicable to the network-side device, and the same technical effect can be achieved.

The transceiver 620 may be used to receive and send data under control of the processor 610. In FIG. 6, a bus architecture may include any number of interconnected buses and bridges. Various circuits, specifically, one or more processors represented by the processor 610 and a storage represented by the storage 630, are linked together. The bus architecture may also link various other circuits such as peripherals, voltage regulators and power management circuits, which are well known in the art, and therefore a further description is omitted herein. The bus interface provides interfaces. The transceiver 620 may be a plurality of elements, that is, includes a transmitter and a receiver, to provide units configured to communicate with various other devices over a transmission medium. The processor 610 is responsible for managing the bus architecture and general processing, and the storage 630 may store data used by the processor 610 when performing operations.

The processor 610 is responsible for managing the bus architecture and general processing, and the storage 630 may store data used by the processor 610 when performing operations.

As shown in FIG. 7, a terminal of an embodiment of the present application includes: a transceiver 720, a storage 740, a processor 710 and a computer program stored in the storage 740 and executable by the processor 710; wherein, the transceiver 720 is configured to:

transmit at least one set of downlink control channel monitoring capability information; where each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

Optionally, the transceiver 720 is further configured to: receive configuration information of a time-domain location of a downlink control channel search space transmitted by a network-side device, wherein the configuration information is used for determining a location of the span in a time domain.

The processor is 710 configured to: determine, based on the configuration information, quantities of symbols in intervals between a current span and adjacent spans;

determine, based on the quantities of symbols in the intervals between the current span and the adjacent spans, the maximum quantity of blind detections and/or the maximum quantity of non-overlapping CCEs within the span;

drop a downlink control channel based on the maximum quantity of blind detections and/or the maximum quantity of non-overlapping CCEs in a case that the quantity of blind detections or the quantity of non-overlapping CCEs configured actually within a span exceeds a maximum blind detection capability of the terminal.

Optionally, the processor 710 is further configured to:

in a case that there is a span, of adjacent spans of the current span, with the quantity of consecutive symbols less than or equal to a target threshold, select the minimum of the quantities of symbols in the intervals between the current span and the adjacent spans as the target interval symbol quantity; wherein the target threshold is equal to a maximum value of the all maximum quantities of consecutive symbols in the at least one set of downlink control channel monitoring capability information reported by the terminal;

determine a maximum value, of all minimum interval symbol quantities which are in the at least one set of downlink control channel monitoring capability information reported by the terminal and less than or equal to the target interval symbol quantity, as the target minimum interval symbol quantity;

determine the maximum quantity of blind detections and/or the maximum quantity of non-overlapping CCEs based on downlink control channel monitoring capability information to which the target minimum interval symbol quantity belongs.

The terminal can report at least one set of downlink control channel monitoring capability information, wherein each set of downlink control channel monitoring capability information includes: the minimum quantity X of symbols in an interval between adjacent spans, the maximum quantity Y of consecutive symbols within a span, and at least one of following information: the quantity of blind detections and the quantity of non-overlapping CCEs supported by a terminal within a span. In this way, the network-side device may receive at least one set of downlink control channel monitoring capability information reported by the terminal, and use the same to maximize the terminal capability in subsequent configurations, to avoid the terminal from failing to achieve maximum capability usage.

It should be noted that, the method of processing the terminal capability is performed by the terminal, and the implementation of the above-mentioned embodiments of the method of processing the terminal capability is applicable to the terminal, and the same technical effect can be achieved.

In FIG. 7, a bus architecture may include any number of interconnected buses and bridges. Various circuits, specifically, one or more processors represented by the processor 710 and a storage represented by the storage 740, are linked together. The bus architecture may also link various other circuits such as peripherals, voltage regulators and power management circuits, which are well known in the art, and therefore a further description thereof is omitted herein. The bus interface provides interfaces. The transceiver 720 may be one or more elements, e.g., multiple transmitters and multiple receivers, to provide units configured to communicate with various other apparatuses over a transmission medium. For example, the transceiver 720 receives external data from other apparatus. The transceiver 720 is configured to send to other devices data processed by the processor 710. Depending on nature of the computing system, user interfaces 730 such as keyboards, displays, speakers, microphones, joysticks may also be provided.

The processor 710 is responsible for managing the bus 700 and general processing. The storage 740 may store data used by the processor 710 when performing operations.

Optionally, the processor 710 may be CPU, ASIC, FPGA or CPLD.

Figure 8:
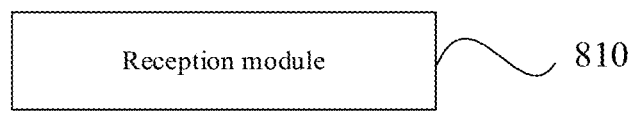
FIG. 8 is a schematic structure illustrating an apparatus for processing a terminal capability, applied to a network-side device according to an embodiment of the present disclosure.

As shown in FIG. 8, an apparatus for processing a terminal capability according to an embodiment of the present disclosure is applied to a network-side device and includes:
- a reception module 810, configured to receive at least one set of downlink control channel monitoring capability information; wherein,
- each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

Optionally, the apparatus further includes:
- a generation module, configured to generate, according to the at least one set of downlink control channel monitoring capability information, configuration information of a time-domain location of a downlink control channel search space, wherein the configuration information is used for determining a location of the span in a time domain;
- a configuration information transmission module, configured to transmit the configuration information.

Optionally, the apparatus further includes:
- a first determination module, configured to determine, based on the configuration information, the quantities of symbols in intervals between a current span and adjacent spans;
- a second determination module, configured to determine, based on the quantities of symbols in the intervals between the current span and the adjacent spans, the maximum quantity of blind detections and/or the maximum quantity of non-overlapping CCEs within the current span;
- a configuration module, configured to configure the current span based on the maximum quantity of blind detections and/or the maximum quantity of non-overlapping CCEs.

Optionally, the second determination module includes:
- a first processing submodule, configured to, in a case that there is a span, of adjacent spans of the current span, with the quantity of consecutive symbols less than or equal to a target threshold, select the minimum of the quantities of symbols in the intervals between the current span and the adjacent spans as the target interval symbol quantity; where the target threshold is equal to a maximum value of the all maximum quantities of consecutive symbols in the at least one set of downlink control channel monitoring capability information reported by the terminal;
- a second processing submodule, configured to determine a maximum value, of all minimum interval symbol quantities which are in the at least one set of downlink control channel monitoring capability information reported by the terminal and less than or equal to the target interval symbol quantity, as the target minimum interval symbol quantity;
- a third processing submodule, configured to determine the maximum quantity of blind detections and/or the maximum quantity of non-overlapping CCEs based on downlink control channel monitoring capability information to which the target minimum interval symbol quantity belongs.

The apparatus can receive at least one set of downlink control channel monitoring capability information reported by the terminal, wherein each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping CCEs supported by a terminal within a span. In this way, the network-side device is able to use at least one set of downlink control channel monitoring capability information reported by the terminal, to maximize the terminal capability in subsequent configurations so as to avoid the terminal from failing to achieve maximum capability usage.

It should be noted that, the method of processing the terminal capability performed by the network-side device is applied to the apparatus, and the implementation of the above-mentioned embodiments of the method of processing the terminal capability is applicable to the apparatus, and the same technical effect can be achieved.

Figure 9:
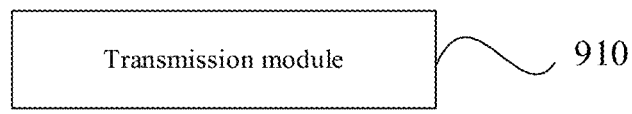
FIG. 9 is a schematic flowchart illustrating an apparatus for processing a terminal capability, applied to a terminal according to an embodiment of the present disclosure.

As shown in FIG. 9, an apparatus of processing a terminal capability according to an embodiment of the present disclosure is applied to a terminal and includes:
- a transmission module 910, configured to transmit at least one set of downlink control channel monitoring capability information; wherein
- each set of downlink control channel monitoring capability information includes: the minimum quantity of symbols in an interval between adjacent spans, the maximum quantity of consecutive symbols within a span, and at least one of following information: the quantity of blind detections and the quantity of non-overlapping Control Channel Elements (CCEs) supported by a terminal within a span.

Optionally, the apparatus further includes:
- a configuration information reception module, configured to receive configuration information of a time-domain location of a downlink control channel search space transmitted by a network-side device, wherein the configuration information is used for determining a location of the span in a time domain;

a third determination module, configured to determine, based on the configuration information, the quantities of symbols in intervals between a current span and adjacent spans;

a fourth determination module, configured to determine, based on the quantities of symbols in the intervals between the current span and the adjacent spans, the maximum quantity of blind detections and/or the maximum quantity of non-overlapping CCEs within the span;

a processing module, configured to drop a downlink control channel based on the maximum quantity of blind detections and/or the maximum quantity of non-overlapping CCEs in a case that the quantity of blind detections or the quantity of non-overlapping CCEs configured actually within a span exceeds a maximum blind detection capability of the terminal.

Optionally, the fourth determination module includes:

a fourth processing submodule, configured to, in a case that there is a span, of adjacent spans of the current span, with the quantity of consecutive symbols less than or equal to a target threshold, select the minimum of the quantities of symbols in the intervals between the current span and the adjacent spans as the target interval symbol quantity; wherein the target threshold is equal to a maximum value of the all maximum quantities of consecutive symbols in the at least one set of downlink control channel monitoring capability information reported by the terminal;

a fifth processing submodule, configured to determine a maximum value, of all minimum interval symbol quantities which are in the at least one set of downlink control channel monitoring capability information reported by the terminal and less than or equal to the target interval symbol quantity, as the target minimum interval symbol quantity;

a sixth processing submodule, configured to determine the maximum quantity of blind detections and/or the maximum quantity of non-overlapping CCEs based on downlink control channel monitoring capability information to which the target minimum interval symbol quantity belongs.

The apparatus can report at least one set of downlink control channel monitoring capability information, wherein each set of downlink control channel monitoring capability information includes: the minimum quantity X of symbols in an interval between adjacent spans, the maximum quantity Y of consecutive symbols within a span, and at least one of following information: the quantity of blind detections and the quantity of non-overlapping CCEs supported by a terminal within a span. In this way, the network-side device may receive at least one set of downlink control channel monitoring capability information reported by the terminal, and use the same to maximize the terminal capability in subsequent configurations, so as to avoid the terminal from failing to achieve maximum capability usage.

It should be noted that, the method of processing the terminal capability performed by the terminal is applied to the apparatus, and the implementation of the above-mentioned embodiments of the method of processing the terminal capability is applicable to the terminal, and the same technical effect can be achieved.

Another embodiment of the present disclosure further provides a computer readable storage medium storing thereon a computer program, and when the program is configured to be executed by a processor, the processor implements the steps of the method of processing the terminal capability performed by the network-side device, or the steps of the method of processing the terminal capability performed by the terminal.

The computer readable media may include persistent and non-persistent, removable media and non-removable media implemented in any method or technology for storage of information. The information may be computer-readable instructions, data structures, program modules or other data. Examples of computer storage medium may include, but are not limited to, Phase-change Random Access Memory (PRAM), Static Random Access Memory (SRAM), Dynamic RAM (DRAM), Random Access Memory (RAM), Read-Only Memory (ROM), Electrically Erasable Programmable ROM (EEPROM), a flash memory or other memory technology, Compact Disc ROM (CD-ROM), Digital Versatile Discs (DVD) or other optical storage, a magnetic tape, a magnetic tape disk storage or other magnetic storage devices, or any other medium which can be used to store information that can be accessed by computing devices. As defined herein, the computer readable media do not include transitory computer readable media (transitory media), such as modulated data signals and carriers.

It is further noted that, the terminals described in this specification include, but are not limited to, smartphones, tablets, etc., and some of the functional components described are referred to as modules in order to more particularly emphasize their implementation independence.

In embodiments of the present disclosure, modules may be implemented in software for execution by various types of processors. For example, an identified executable code module may include one or more physical or logical blocks of computer instructions, which may be constructed, for example, as objects, procedures, or functions. Nevertheless, the executable codes of an identified module need not be physically located together, but may include disparate instructions stored in different locations. When the instructions are joined logically together, the instructions form a module and achieve a stated purpose for the module.

In fact, an executable code module can be a single instruction or many instructions, and can even be distributed over several different code segments, among different programs, and across multiple storage devices. Similarly, operational data can be identified within the module and can be implemented in any appropriate form and organized within any appropriate type of data structure. The operational data may be collected as a single data set, or may be distributed in different locations (including on different storage devices) and may exist, at least in part, only as electronic signals on a system or network.

Taking into account the level of hardware processes in the related art, when the module can be implemented using software, modules that can be implemented in software can be built with corresponding hardware circuits to achieve the corresponding functions by one skilled in the art, without regard to cost. The hardware circuits include conventional Very Large Scale Integration (VLSI) circuits or gate arrays as well as semiconductors or other discrete components in related art such as logic chips, transistors, etc. Modules may also be implemented with programmable hardware devices, such as field-programmable gate arrays, programmable array logic, programmable logic devices, etc.

The above exemplary embodiments are described with reference to these drawings, and many different forms and embodiments are possible without departing from the spirit and teachings of the present disclosure. Therefore the present disclosure should not be construed as being limited within the exemplary embodiments presented herein. More specifically, these exemplary embodiments are provided so that the present disclosure will be complete and will convey the scope of the present disclosure to those skilled in the art. In these drawings, component sizes and relative sizes may be exaggerated for clarity. The terminology used herein is for the purpose of describing specific exemplary embodiments and is not intended to be limiting. As used herein, singular forms "one", "a" and "the" are intended to include those plural forms unless the context clearly requires otherwise. It is further understood that, the terms "comprising" and/or "including", when used in this specification, denote the presence of the features, integers, steps, operations, components and/or assemblies, but do not exclude the presence or addition of one or more other features, integers, steps, operations, components, assemblies and/or groups thereof. Unless otherwise indicated, when stated, a range of values includes upper and lower limits of the range and any subranges therebetween.

The descriptions above are optional embodiments of the present disclosure. It should be noted that improvements and embellishments may be made by one skilled in the art without departing from the principle of the present disclosure, and such improvements and embellishments shall be within the protection scope of the present disclosure.

What is claimed is:

1. A method of processing a terminal capability, performed by a network-side device, comprising:
    receiving at least one set of downlink control channel monitoring capability information; wherein, each set of downlink control channel monitoring capability information comprises a minimum quantity of symbols in an interval between adjacent spans, a maximum quantity of consecutive symbols within a span, and at least one of following information:
    a quantity of blind detections and a quantity of non-overlapping Control Channel Elements (CCEs) supported by a terminal within a span,
    wherein subsequent to receiving the at least one set of downlink control channel monitoring capability information, the method further comprises:
    generating, according to the at least one set of downlink control channel monitoring capability information, configuration information of a time-domain location of a downlink control channel search space, wherein the configuration information is used for determining a location of a span in a time domain;
    transmitting the configuration information.

2. The method according to claim 1, wherein subsequent to generating the configuration information of the time-domain location of the downlink control channel search space, the method further comprises:
    determining, based on the configuration information, quantities of symbols in intervals between a current span and adjacent spans;
    determining, based on the quantities of symbols in the intervals between the current span and the adjacent spans, a maximum quantity of blind detections and/or a maximum quantity of non-overlapping CCEs within the current span;
    configuring the current span based on the maximum quantity of blind detections and/or the maximum quantity of non-overlapping CCEs.

3. The method according to claim 2, wherein determining, based on the quantities of symbols in the intervals between the current span and the adjacent spans, the maximum quantity of blind detections and/or the maximum quantity of non-overlapping CCEs within the current span comprises:
    selecting a minimum of the quantities of symbols in the intervals between the current span and the adjacent spans as a target interval symbol quantity, in a case that there is a span, of the adjacent spans of the current span, with a quantity of consecutive symbols less than or equal to a target threshold; wherein the target threshold is equal to a maximum value of all maximum quantities of consecutive symbols in the at least one set of downlink control channel monitoring capability information reported by the terminal;
    determining a maximum value, of all minimum interval symbol quantities in the at least one set of downlink control channel monitoring capability information reported by the terminal and less than or equal to the target interval symbol quantity, as a target minimum interval symbol quantity;
    determining the maximum quantity of blind detections and/or the maximum quantity of non-overlapping CCEs based on downlink control channel monitoring capability information to which the target minimum interval symbol quantity belongs.

4. A method of processing a terminal capability, performed by a terminal, comprising:
    transmitting at least one set of downlink control channel monitoring capability information; wherein each set of downlink control channel monitoring capability information comprises: a minimum quantity of symbols in an interval between adjacent spans, a maximum quantity of consecutive symbols within a span, and at least one of following information:
    a quantity of blind detections and a quantity of non-overlapping Control Channel Elements (CCEs) supported by a terminal within a span,
    wherein subsequent to transmitting the at least one set of downlink control channel monitoring capability information, the method further comprises:
    receiving configuration information of a time-domain location of a downlink control channel search space transmitted by a network-side device, wherein the configuration information is used for determining a location of a span in a time domain.

5. The method according to claim 4, wherein subsequent to transmitting the at least one set of downlink control channel monitoring capability information, the method further comprises:
    determining, based on the configuration information, quantities of symbols in intervals between a current span and adjacent spans;
    determining, based on the quantities of symbols in the intervals between the current span and the adjacent spans, a maximum quantity of blind detections and/or a maximum quantity of non-overlapping CCEs within the span;
    dropping a downlink control channel based on the maximum quantity of blind detections and/or the maximum quantity of non-overlapping CCEs in a case that the quantity of blind detections or the quantity of non-overlapping CCEs configured actually within a span exceeds a maximum blind detection capability of the terminal.

6. The method according to claim 5, wherein determining, based on the quantities of symbols in the intervals between the current span and the adjacent spans, the maximum quantity of blind detections and/or the maximum quantity of non-overlapping CCEs within the span comprises:
    selecting a minimum of the quantities of symbols in the intervals between the current span and the adjacent spans as a target interval symbol quantity, in a case that there is a span, of the adjacent spans of the current span, with a quantity of consecutive symbols less than or equal to a target threshold; wherein the target threshold is equal to a maximum value of all maximum quantities of consecutive symbols in the at least one set of downlink control channel monitoring capability information reported by the terminal;

determining a maximum value, of all minimum interval symbol quantities in the at least one set of downlink control channel monitoring capability information reported by the terminal and less than or equal to the target interval symbol quantity, as a target minimum interval symbol quantity;

determining a maximum quantity of blind detections and/or a maximum quantity of non-overlapping CCEs based on downlink control channel monitoring capability information to which the target minimum interval symbol quantity belongs.

7. A network-side device, comprising a transceiver, a storage, a processor and a computer program stored on the storage and executable by the processor; wherein, the transceiver is configured to perform steps of the method of processing a terminal capability according to claim 1.

8. The network-side device according to claim 7, wherein, the processor is further configured to:

determine, based on the configuration information, quantities of symbols in intervals between a current span and adjacent spans;

determine, based on the quantities of symbols in the intervals between the current span and the adjacent spans, a maximum quantity of blind detections and/or a maximum quantity of non-overlapping CCEs within the current span;

configure the current span based on the maximum quantity of blind detections and/or the maximum quantity of non-overlapping CCEs.

9. The network-side device according to claim 8, wherein, the processor is further configured to:

select a minimum of the quantities of symbols in the intervals between the current span and the adjacent spans as a target interval symbol quantity, in a case that there is a span, of the adjacent spans of the current span, with a quantity of consecutive symbols less than or equal to a target threshold; wherein the target threshold is equal to a maximum value of all maximum quantities of consecutive symbols in the at least one set of downlink control channel monitoring capability information reported by the terminal;

determine a maximum value, of all minimum interval symbol quantities in the at least one set of downlink control channel monitoring capability information reported by the terminal and less than or equal to the target interval symbol quantity, as a target minimum interval symbol quantity;

determine the maximum quantity of blind detections and/or the maximum quantity of non-overlapping CCEs based on downlink control channel monitoring capability information to which the target minimum interval symbol quantity belongs.

10. A terminal, comprising a transceiver, a storage, a processor and a computer program stored on the storage and executable by the processor; wherein, the transceiver is configured to:

transmit at least one set of downlink control channel monitoring capability information; wherein each set of downlink control channel monitoring capability information comprises: a minimum quantity of symbols in an interval between adjacent spans, a maximum quantity of consecutive symbols within a span, and at least one of following information:

a quantity of blind detections and a quantity of non-overlapping Control Channel Elements (CCEs) supported by a terminal within a span, wherein, the transceiver is further configured to: receive configuration information of a time-domain location of a downlink control channel search space transmitted by a network-side device, wherein the configuration information is used for determining a location of a span in a time domain.

11. The terminal according to claim 10, wherein, the processor is configured to: determine, based on the configuration information, quantities of symbols in intervals between a current span and adjacent spans;

determine, based on the quantities of symbols in the intervals between the current span and the adjacent spans, a maximum quantity of blind detections and/or a maximum quantity of non-overlapping CCEs within the span;

drop a downlink control channel based on the maximum quantity of blind detections and/or the maximum quantity of non-overlapping CCEs in a case that the quantity of blind detections or the quantity of non-overlapping CCEs configured actually within a span exceeds a maximum blind detection capability of the terminal.

12. The terminal according to claim 11, wherein, the processor is further configured to:

select a minimum of the quantities of symbols in the intervals between the current span and the adjacent spans as a target interval symbol quantity, in a case that there is a span, of the adjacent spans of the current span, with a quantity of consecutive symbols less than or equal to a target threshold; wherein the target threshold is equal to a maximum value of all maximum quantities of consecutive symbols in the at least one set of downlink control channel monitoring capability information reported by the terminal;

determining a maximum value, of all minimum interval symbol quantities in the at least one set of downlink control channel monitoring capability information reported by the terminal and less than or equal to the target interval symbol quantity, as a target minimum interval symbol quantity;

determining the maximum quantity of blind detections and/or the maximum quantity of non-overlapping CCEs based on downlink control channel monitoring capability information to which the target minimum interval symbol quantity belongs.

13. A non-transitory computer readable storage medium, storing thereon a computer program, wherein in a case that the computer program is executed by a processor, the processor implement the steps of the method of processing the terminal capability according to claim 1.

14. A non-transitory computer readable storage medium, storing thereon a computer program, wherein in a case that the computer program is executed by a processor, the processor implement the steps of the method of processing the terminal capability according to claim 4.

* * * * *